June 10, 1969  W. J. KUDLATY  3,448,862

FILTER MEDIA HAVING AN INCREASED FILTER AREA

Filed March 26, 1968

INVENTOR.
Walter J. Kudlaty,
BY Parker & Carter
Attorneys.

United States Patent Office 3,448,862
Patented June 10, 1969

3,448,862
FILTER MEDIA HAVING AN INCREASED FILTER AREA
Walter J. Kudlaty, Elmhurst, Ill., assignor to Marvel Engineering Company, Chicago, Ill., a corporation of Delaware
Filed Mar. 26, 1968, Ser. No. 716,063
Int. Cl. B01d 25/16
U.S. Cl. 210—489                          1 Claim

ABSTRACT OF THE DISCLOSURE

A filter media formed of a first layer of pleated mesh material, a second layer overlying said first layer, said second layer conforming to and following the pleats of said first layer and being itself pleated upon the pleats of said first layer.

---

A filter media having an increased filter area and form of an inner layer of mesh material arranged in a circumferentially pleated form, a pleated layer overlying and following the pleats of said first layer but being itself individually pleated throughout its extension, said second layer having a substantial number of pleats overlying each radially extending surface of said first layer.

This invention relates to filters and has for one of its purposes the provision of a filter media having an increased filter area.

Another purpose is to provide a filter media having a first pleated layer of a first mesh material and a second layer of a second mesh material, with said second layer being itself pleated along the entire pleated surface of said first layer.

Another purpose is to provide a filter media having a pleated backup surface of mesh material and an external filtering material pleated along the entire surface of all of the pleats of said first layer.

Another purpose is to provide a filter media structure having a fine mesh filtering member and a pleated support therefor formed of coarser mesh material.

Another purpose is to provide a filter media having a filtering surface area substantially increased over that of prior filter media employed within the same available envelope.

Another purpose is to provide a dual layer filtering member having an inner layer having pleats of a given spacing and an outer layer having pleats of lesser spacing.

Other purposes will appear from time to time during the course of the specification and claim.

Figure 1:
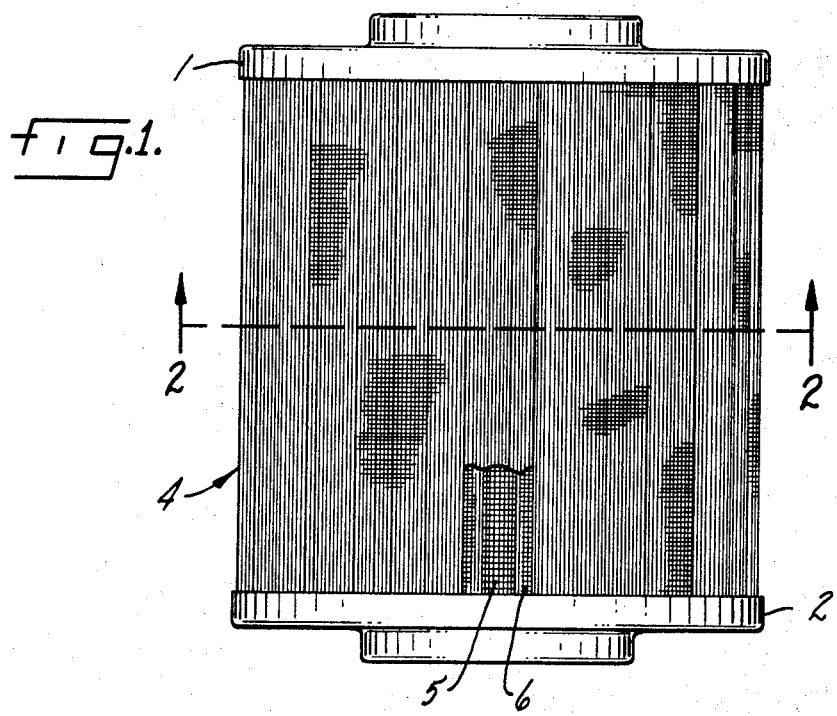
Figure 2:
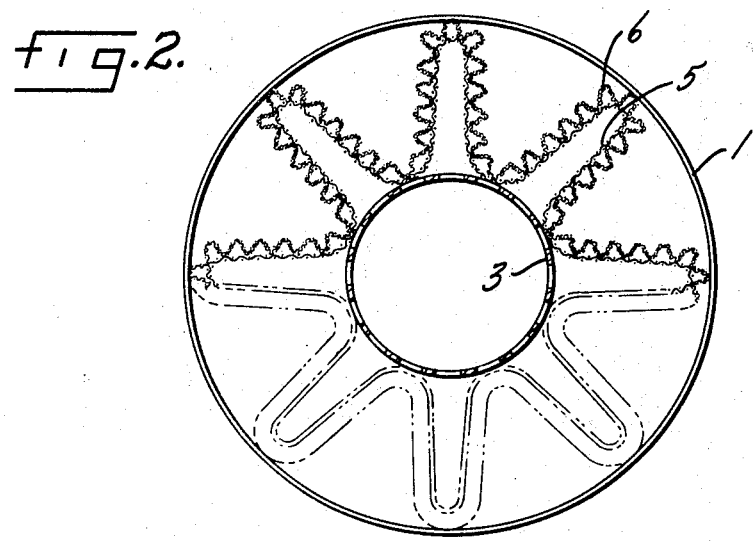

The invention is illustrated more or less diagrammatically in the accompanying drawings wherein:

FIGURE 1 is a side view of a filter element; and
FIGURE 2 is a view taken on the line 2—2 of FIGURE 1.

Like parts are indicated by like numerals throughout the specification and drawings.

Referring now to the drawings, FIGURE 1 illustrates a filter element including a set of spaced end caps 1, 2. A core 3 of perforated material is seen in cross section in FIGURE 2 and extends between the caps 1, 2. It will be understood that, in some installations, the core 3 may be dispensed with without departing from the nature and scope of the invention.

Extending between the caps 1, 2 and, as illustrated, arranged about the core 3 is a filter media 4. The filter media 4 includes an inner pleated layer 5 of comparatively open wire mesh material having substantial strength. Overlying all external surfaces of the layer 5 is a filtering layer 6.

The main filtering layer 6, formed of finer wire mesh material, is itself pleated throughout its length, the pleats of material 6 being substantially of shorter radius or depth and closer spacing than the pleats of layer 5. In the form illustrated, for example, it will be observed that from five to six pleats of the layer 6 are positioned along each radial external surface of the layer 5, the pleats continuing around the outer curved surfaces of each pleat in the layer 5. With deeper pleats in layer 5 it will be realized that a greater number of pleats of the size shown in layer 6 may be positioned along each such radial surface of layer 5.

Whereas there has been shown and described an operative form of the invention, it should be understood that this showing and description are to be taken in an illustrative or diagrammatic sense only. For example, while layer 5 is shown and described as being of greater mesh and layer 6 as of finer, filtering mesh, these roles may be reversed, the layer 6 being of larger mesh and serving to catch or filter larger particles of deleterious material and the layer 5 being formed of finer mesh for filtering smaller particles able to pass through such larger-mesh layer 6. Similarly, while layers 5 and 6 are shown and described as formed of woven wire, it will be realized that said layers may be formed of varying filtering materials capable of accepting a pleated sheet configuration. There may occur many modifications in and to the invention which will be apparent to those skilled in the art and which will fall within the scope and spirit of the invention.

The use and operation of the invention are as follows:

The filter media of the invention is formed by pleating a sheet of wire mesh material and arranging the resulting pleated sheet in a circle, as indicated in FIGURE 2, joining the opposite lateral ends thereof to retain the layer 5 in the circumferentially pleated configuration shown in FIGURE 2.

A second sheet of wire mesh material is independently pleated in tighter pleats of lesser depth or height and is arranged in overlying relationship with the entire external surface of the layer 5, as shown in FIGURE 2. The opposite lateral edges of the layer 6 are joined.

Whatever assembly sequence be followed, the resulting filter media, formed of the layers 5 and 6, are positioned between end caps 1 and 2 to form the filter element illustrated in FIGURE 1, the pleats of both layers 5 and 6 extending between and engaging caps 1 and 2 in suitably sealed relationship therewith.

The layers 5 and 6 have mesh sizes suited to the filtering problem at hand. Normally layer 5 may be of a stronger open wire mesh and layer 6 of a finer mesh, but these mesh characteristics may be reversed when desired. Similarly, the invention contemplates substantially equal mesh sizes in layers 5 and 6 should the same be otherwise desired.

Employment of the invention in relation to filter elements capable of employing a support layer having relatively widespread pleats, of the type shown in FIGURE 2, permits of relatively easy cleaning of layer 6 after a period of use. The scope and spirit of the invention includes its employment with a layer 5 of closer pleating which may be cleaned with more difficulty or which may be discarded when contaminated. In any event employment of the invention produces a greatly increased total filtering area over that produced by the prior employment of a flat, upleated layer of finer filtering mesh overlying and following the pleats of an inner support layer, such as the layer 5. Thus the "pleats-on-pleats" structure of the invention will serve to increase the available filtering area in any filter situation in which it may be economically and feasibly employed, it being understood that end caps 1 and 2, with media 4, form a filter element required to fit within the "envelope" defined by a filter housing (not shown) and that such filter element will be designed in respect to filtration of a specific fluid at specific flow rates, volumes, pressures and similar parameters.

I claim:
1. A filter media comprising a cylindrical inner, continuously, uniformly pleated layer and a cylindrical outer, continuously, uniformly pleated layer, said outer pleated layer following the cross-sectional pleated configuration of said inner layer and being itself pleated throughout its length, the pleats of said outer layer being substantially lesser in height and greater in number than the pleats of said inner layer, the inner and outer pleated layers being so constructed and arranged that each pleat of the inner layer has a substantially greater number of the pleats of the outer layer in contiguous relationship thereto, the pleats of said inner and outer layers being V-shaped in cross section and defining within each pleat a space wider at its inner base portion than at its outer tip portion.

References Cited

UNITED STATES PATENTS

| | | | |
|---|---|---|---|
| 1,830,096 | 11/1931 | Dollinger | 55—500 |
| 1,883,715 | 10/1932 | Greene | 55—487 |
| 2,058,669 | 10/1936 | Dollinger | 55—521 X |
| 2,344,384 | 3/1944 | Altenkirch | 210—493 X |
| 2,398,045 | 4/1946 | Schaaf | 55—521 X |
| 2,514,623 | 7/1950 | Brown | 55—487 X |
| 2,606,628 | 8/1952 | Hasselwander | 210—493 X |
| 2,730,241 | 1/1956 | Thomas | 210—493 X |
| 3,280,985 | 10/1966 | Czerwonka | 210—493 X |

FOREIGN PATENTS 856,686    12/1960    Great Britain.

REUBEN FRIEDMAN, *Primary Examiner.*

C. M. DITLOW, *Assistant Examiner.*

U.S. Cl. X.R.

55—487, 498, 510, 521; 210—492, 493, 499